Patented Dec. 4, 1945

2,390,063

UNITED STATES PATENT OFFICE 2,390,063

PROCESS FOR THE PREPARATION OF PRODUCTS FROM LIGNIN BY HYDROGENATION

Karl Freudenberg and Willy Lautsch, Heidelberg, Germany; vested in the Alien Property Custodian No Drawing. Original application July 29, 1940, Serial No. 348,079½. Divided and this application September 19, 1940, Serial No. 357,498. In Germany July 29, 1939

6 Claims. (Cl. 260—124)

This invention relates to a process of making products from lignin by hydrogenation. The hydrogenation of lignin or lignin containing substances has been tried several times. Distillation with zinc-dust has not lead to technical or commercial results. Somewhat better results have been obtained by carrying out the hydrogenation with hydrogen under pressure and in the presence of catalysts. Thus, Fierz-David and Hennig have used a distillation in hydrogen under pressure in the presence of nickel and obtained a mixture of rather volatile constituents and tar having a total weight of about 20% of the used amount of lignin. In the tarry constituents there could be ascertained, besides acids, alcohols, diketones, furane derivatives etc., about 8% of a mixture of different phenols.

This application is a division of our application S. N. 348,079½, filed July 29, 1940.

Another mode of operation differing somewhat from the aforementioned processes has been tried by Harris, D'Janni and Adkins (see Journal American Chemical Society 60, 1467, 1938), who have dissolved the lignin or lignin constituents—which for the greatest part are insoluble in water—in alcohol in the presence of mineral acids and carried out the hydrogenation in organic solvents under pressure, using the oxides of chrome and copper as catalyst. In this case there had been obtained mainly hydro-aromatic alcohols, that is derivatives of the cyclo-hexyl-propane. This process requires a preliminary treatment of the lignin with an alcoholic mineral acid and results, especially in case of conifers, in a solution of only a part of the lignin or lignin constituents. Besides, hydrogenation is carried out in such case in organic solvents, for instance dioxane. Owing to these necessities, however, the obtained product is but of limited commercial use. Now, we have found that the catalyst used by these inventors is not well suitable for the present process which is destined for the production of other products.

More particularly, we have found that essentially more favorable results may be attained by carrying out the hydrogenation with hydrogen under pressure in the presence of a suitable catalyst in an aqueous alkaline medium. In this case the dissolving and splitting action of dilute hot alkali will come into effect simultaneously with the hydrogenation. Accordingly, the process may be carried out with greater uniformity in an aqueous solution or suspension. It is a surprising fact that with our new process more than one half of the lignin of the form of phenols or phenol derivatives may be converted into a condition permitting dissolution in ether. Heretofore this could not be attained with any known process of hydrogenating lignin. In addition, our new process is connected with the important advantage, that it may be successfully applied to wood substance as well as to isolated lignins or lignin derivatives, such as lignin sulphoacid, sulphite cellulose waste lye, black lye and the like.

Example 1

300 g. of cuproxam-lignin (obtained from wood-flour or the like by extraction and treatment with copper oxide and ammonia), are mixed with 3 liters of a 10% nickel sulphate solution whereupon the mixture is heated to boiling temperature and dilute sodium lye added by drops to this mixture with stirring, until all nickel has precipitated as hydroxide. The residue is thereupon removed by filtering, washed out, slurried in 3 liters of water and subjected to hydrogenation in a high-pressure autoclave after addition of 85 g. of caustic soda. Treatment in the autoclave is carried out by introducing thereinto hydrogen under a pressure up to 80 atmospheres superatmospheric, and thereupon heat is slowly applied with constant stirring, until the temperature after about two hours assumes a value of 260° C. The pressure thus generated in the autoclave will be about within 190 and 210 atmospheres, superatmospheric. The mixture is left standing for about two hours at the stated temperature.

On cooling the mass is removed from the nickel catalyst by filtering, preferably with exclusion of air, washed again slightly and the alkaline filtrate treated with carbonic acid under pressure in order to liberate the phenols. The solution which contains mainly pyrocatechin, guajacol, creosol as well as their higher homologues may either be subjected to further treatment or the phenols may be obtained therefrom in known manner, for instance by extraction and fractional distillation.

On thorough shaking of the solution with ether or another suitable solvent and evaporation of the solvent there is obtained a residue of phenol in an amount of about 180 g., corresponding to 60% of the used lignin. About one half of this residue consisting of approximately even proportions of pyrocatechin, guajacol and their homologues may be distilled and the constituents isolated in pure condition by means of distillation in high vacuum and fractionation (for instance in the Widmer spiral).

Example 2

300 g. of lignin, isolated by means of a mixture of hydrochloric acid and phosphoric acid are stirred with 3 liters of a 10% nickel sulphate solution and the nickel precipitated as a carbonate on the lignin with dilute solution of soda. The residue on being removed by suction and washed is slurried with 3 liters of water and mixed with 160 g. of solid caustic soda. The mixture is thereupon subjected to hydrogenation under pressure carried out under the same conditions as in Example 1. Isolation of the phenols is likewise conducted in the manner stated in Example 1. The yield is also the same as given in this example.

Example 3

The mode of operation is the same as in Example 1, the difference being only that palladium is used as a catalyst. Palladium is precipitated on the lignin as metal by reduction with formaldehyde. Hydrogenation under pressure, mode of working as well as the yields are approximately the same as in Example 1.

Example 4

6 liters of sulphite cellulose waste lye containing 240 g. of lignin are neutralized with sodium lye and, in addition, mixed with an excess of 100 g. solid caustic soda. This solution is mixed with a composite catalyst consisting of nickel sulphide, iron sulphide and activated carbon. This catalyst had been prepared by adding 100 g. of activated carbon to a solution of 60 g. of nickel sulphate, 60 g. of ferrous sulphate and 150 g. of sodium acetate, followed by saturation with sulphuretted hydrogen, removal by suction and washing with water. The composite catalyst consisting of a mixture of sulphite waste lye is subjected to hydrogenation under pressure in an autoclave. Similarly to Example 1, at first hydrogen is introduced until the pressure is raised to a pressure of 120 atmospheres, superatmospheric and after about two hours the temperature is raised to 260° C. by heating. The reaction pressure at 260° C. is approximately 270 atmospheres, superatmospheric. After about eight hours the mass is cooled and saturated with carbonic acid with the result of giving off large amounts of sulphuretted hydrogen. By working the mass as above stated, there will be obtained products which are soluble in ether, that is mainly again pyrocatechin, guajacol and creosol in an amount of about 120 g. corresponding to approximately 50% of the used lignin.

In the foregoing we have shown that lignin or substances containing lignin, including sulphite cellulose waste lye may be converted in an alkaline medium in the presence of catalyst and compressed hydrogen in an amount up to 50% of the lignin constituent into products which are soluble in either. According to the kind of catalyst used these products belong to the phenol series or to the cyclo-paraffinic alcohols generated therefrom.

In further developing our invention we have found, that products which are soluble in ether may also be obtained without the use of a catalyst, when using sufficiently high temperatures and pressures during carrying out the process.

At temperatures of about 260° C. the proportion of phenols having a higher molecular weight will preponderate, while the additionally produced cyclic alcohols belong mainly to the cyclohexane series. Also at 300° C. the proportion of phenol is greater and the proportion of alcohols smaller. The phenols have a high boiling point and are only to a small part lignin products with but one nucleus, while the products obtained in accordance with the foregoing part of this specification with catalysts are of a much more simple structure and consequently may be distilled more easily. Thus, with increasing temperature the proportion of cyclo-paraffinic alcohols likewise increases. Increasing temperature will further cause a narrowing of the ring structure and conversion from the cyclo-hexane to the cyclo-pentane series.

Accordingly, at a temperature of about 350° C. predominantly alcohols of the cyclo-hexane and cyclo-pentane series are obtained, in an amount corresponding to 35% of the proportion of lignin. Besides, there is obtained a small amount, about 14%, of phenols. Using still higher temperatures and long reaction times the proportion of phenol will disappear more and more in favor of the mentioned alcohols. For instance, if the temperature is raised above the range of 370–400° C., the aforementioned specific lignin products will undergo further changes and approach the products obtained in the synthetic production of benzene.

Example 5

1000 ccm. of an aqueous solution of sodium sulphite of lignin corresponding to 118.5 g. of lignin, on adding 60 g. of sodium hydroxide are heated to a temperature of 345–355° C. in a shaking autoclave, hydrogen being introduced under a pressure between 100 and 120 atmospheres superatmospheric. The alkaline solution on cooling is well shaken together with ether, the separated ethereal solution dried and the ether evaporated. There is obtained as residue 42–45 g. of neutral constituents corresponding to 35–38% of the used lignin. 60% of this amount, that is 21% of the used lignin, can be distilled in normal or high vacuum. The low boiling fractions comprise the cyclo-pentanol and its homologues, while the higher boiling fractions belong in part to the cyclic alcohols with 6 members. If carbonic acid is introduced into the alkaline solution which is liberated from neutral constituents as far as to saturation of this solution, there can be obtained by renewed extraction with ether about 17 g. of phenolic constituents, corresponding to 14.5% of the used lignin.

Example 6

500 ccm. of an aqueous solution of sodium sulphate of lignin, corresponding to 70.5 g. of lignin, on addition of 40 g. of sodium bicarbonate and impression of hydrogen having a pressure of 100 atmospheres, superatmospheric, are heated during four hours to a temperature between 345 and 350° C. On cooling the mass is de-etherized and on evaporation of the ether there will remain 20 g. of a substance corresponding to 28.4% of the used lignin, this substance consisting mainly of cyclic alcohols.

Example 7

550 ccm. of an aqueous solution of sodium sulphate of lignin corresponding to 28.2 g. of lignin, on addition of 17 g. of sodium bicarbonate at an initial pressure of the introduced hydrogen of 30 atmospheres, superatmospheric are heated for three hours to a temperature between 400 and 420° C. The yield of neutral constituents (cyclohexanols) amounts to 5.3 g., that is 18.8% of the used lignin.

*Example 8*

500 ccm. of an aqueous solution of sodium sulphate of lignin containing 28.2 g. of lignin on addition of 10 g. of sodium hydroxide with a pressure of the introduced hydrogen of 80 atmospheres, superatmospheric are heated for six hours to a temperature of 260° C. The mass is worked in the same manner as in Example 5. There will be obtained 1.7 g. of neutral constituents and 4.7 g. of phenols corresponding to 6% and 16.7%, respectively, of the used lignin.

The neutral constituents produced according to Examples 4 to 8 may be subsequently hydrogenated with or without a catalyst (at higher temperatures without a catalyst and with or without the use of a solvent) in order to effect complete hydrogenation and further splitting at 260–350° C. at a pressure of 80 to 100 atmospheres, superatmospheric. Up to 70% of the products obtained in this way can no more be distilled.

We claim:

1. A non-catalytic process for the hydrogenation of a material selected from the group consisting of sodium salts of lignin obtained from waste liquors of the sulphite pulp process and sodium salts of lignin obtained from waste liquors of the sulphate pulp process, which comprises reacting the said material under pressure with hydrogen in an aqueous alkaline medium, at a temperature of the order of 250° C. to 420° C., the introduction pressure of the hydrogen ranging from 30 to 120 atmospheres and recovering the reaction products.

2. A non-catalytic process for the hydrogenation of a material selected from the group consisting of sodium salts of lignin obtained from waste liquors of the sulphite pulp process and sodium salts of lignin obtained from waste liquors of the sulphate pulp process, which comprises reacting the said material under pressure with hydrogen in an aqueous alkaline medium, at a temperature of the order of 250° C. to 420° C., the introduction pressure of the hydrogen ranging from 30 to 120 atmospheres and separating the reaction products by distillation.

3. A non-catalytic process for the hydrogenation of a material selected from the group consisting of sodium salts of lignin obtained from waste liquors of the sulphite pulp process and sodium salts of lignin obtained from waste liquors of the sulphate pulp process, which comprises reacting the said material under pressure with hydrogen in an aqueous alkaline medium, at a temperature of the order of 250° C. to 420° C., the introduction pressure of the hydrogen ranging from 30 to 120 atmospheres and recovering the phenols and cyclic alcohols produced.

4. A non-catalytic process for the hydrogenation of sodium salts of lignin obtained from waste liquors of the sulphite pulp process, which comprises reacting the sodium sulphite of lignin under pressure with hydrogen in an aqueous alkaline medium, at a temperature of the order of 250° C. to 420° C., the introduction pressure of the hydrogen ranging from 30 to 120 atmospheres and recovering the phenols and cyclic alcohols produced.

5. A non-catalytic process for the hydrogenation of sodium salts of lignin obtained from waste liquors of the sulphate pulp process, which comprises reacting the sodium sulphate of lignin under pressure with hydrogen in an aqueous alkaline medium, at a temperature of the order of 250° C. to 420° C., the introduction pressure of the hydrogen ranging from 30 to 120 atmospheres and recovering the phenols and cyclic alcohols produced.

6. A process for the production of valuable products from a material selected from the group consisting of sodium salts of lignin obtained from waste liquors of the sulphite pulp process and sodium salts of lignin obtained from waste liquors of the sulphate pulp process, which consists in reacting the said material under pressure with hydrogen in an aqueous alkaline medium, at a temperature of the order of 250° C. to 420° C., the introduction pressure of the hydrogen ranging from 30 to 120 atmospheres and recovering the phenols and cyclic alcohols produced.

KARL FREUDENBERG.
WILLY LAUTSCH.